US011492125B2

(12) United States Patent
Braun et al.

(10) Patent No.: US 11,492,125 B2
(45) Date of Patent: Nov. 8, 2022

(54) MIXER ASSEMBLY WITH SURROUNDING FILTER ELEMENT, STOWAGE SPACE WITH MIXER ASSEMBLY, VEHICLE WITH A STOWAGE SPACE AND METHOD FOR INSTALLING A MIXER ASSEMBLY

(71) Applicant: Airbus Operations GmbH, Hamburg (DE)

(72) Inventors: Felix Braun, Hamburg (DE); Jens Lohmar, Hamburg (DE); Henning Everth, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 758 days.

(21) Appl. No.: 16/519,160

(22) Filed: Jul. 23, 2019

(65) Prior Publication Data

US 2020/0031477 A1 Jan. 30, 2020

(30) Foreign Application Priority Data

Jul. 27, 2018 (DE) ..................... 10 2018 118 198.1

(51) Int. Cl.
*B64D 13/02* (2006.01)
*B64D 13/06* (2006.01)
(Continued)

(52) U.S. Cl.
CPC ......... *B64D 13/06* (2013.01); *B01D 46/2403* (2013.01); *B01D 46/4281* (2013.01);
(Continued)

(58) Field of Classification Search
CPC ............ B64D 13/06; B64D 2013/0651; B64D 2013/0688; B64D 2013/0685;
(Continued)

(56) References Cited

U.S. PATENT DOCUMENTS 3,893,829 A 7/1975 Valentino
8,858,889 B2 10/2014 Howe et al.
(Continued)

FOREIGN PATENT DOCUMENTS

EP 3599169 A1 * 1/2020 ......... B01D 46/2403

OTHER PUBLICATIONS

German Search Report; priority document.

*Primary Examiner* — Dung H Bui
(74) *Attorney, Agent, or Firm* — Greer, Burns & Crain, Ltd.

(57) ABSTRACT

A mixer assembly for mixing two air streams in a ventilation system. The mixer assembly comprises a mixing chamber, which comprises an inlet and an outlet and a mixing chamber wall delimiting the mixing chamber, and also a shroud, which surrounds the mixing chamber wall, at least in certain portions. The shroud forms and delimits an intermediate space between the mixing chamber wall and the shroud. The mixer assembly also comprises a filter element, which fluidically connects the intermediate space to a surrounding area of the mixer assembly, the intermediate space being fluidically connected to the mixing chamber. Fluid can thus flow through the filter element into the intermediate space and further into the mixing chamber. A stowage space with a mixer assembly, an aircraft with such a stowage space and a method for producing a mixer assembly in an aircraft are also described.

14 Claims, 5 Drawing Sheets

(51) Int. Cl.
   *B01D 46/24*   (2006.01)
   *B01D 46/42*   (2006.01)
   *F24F 13/04*   (2006.01)
   *B01F 25/20*   (2022.01)
   *F24F 13/28*   (2006.01)
   *B64G 1/48*    (2006.01)

(52) U.S. Cl.
   CPC .............. *B01F 25/20* (2022.01); *F24F 13/04* (2013.01); *B64D 2013/0651* (2013.01); *B64D 2013/0685* (2013.01); *B64D 2013/0688* (2013.01); *B64G 1/48* (2013.01); *F24F 13/28* (2013.01)

(58) Field of Classification Search
   CPC . B01D 46/2403; B01D 46/4281; B01F 25/20; F24F 13/04; F24F 13/28; B64G 1/48
   See application file for complete search history.

(56) References Cited

U.S. PATENT DOCUMENTS

2001/0049927 A1   12/2001   Toepel
2015/0064061 A1   3/2015    Taghipour

\* cited by examiner

MIXER ASSEMBLY WITH SURROUNDING FILTER ELEMENT, STOWAGE SPACE WITH MIXER ASSEMBLY, VEHICLE WITH A STOWAGE SPACE AND METHOD FOR INSTALLING A MIXER ASSEMBLY

CROSS-REFERENCES TO RELATED APPLICATIONS

This application claims the benefit of the German patent application No. 10 2018 118 198.1 filed on Jul. 27, 2018, the entire disclosures of which are incorporated herein by way of reference.

FIELD OF THE INVENTION

The invention relates to a mixer assembly with a surrounding filter element, to a stowage space with a mixer assembly, to a vehicle with a stowage space and to a method for installing a mixer assembly. In particular, the invention relates to a mixer assembly with a filter element, which fluidically connects an intermediate space surrounding a mixing chamber to a surrounding area of the mixer assembly, and also to a stowage space with such a mixer assembly and to an aircraft with such a stowage space. The invention also relates to a method for quickly installing a mixer assembly in an aircraft.

BACKGROUND OF THE INVENTION

In conventional aircraft, a mixing chamber for mixing fresh air with recirculation air is usually accommodated in the belly of the aircraft, where the recirculation air is extracted directly and conveyed into the mixing chamber. In order to ensure the most uniform possible extraction on both sides of the aircraft and in order to create a redundancy of the ducting components, two intake lines each with a filter element are arranged at the mixing chamber.

FIG. 1 shows by way of example a view of a conventional mixing chamber 20 with two symmetrically arranged intake lines 21, at the ends of which a filter element 22 is respectively attached. The air cleaned by the filter elements 22 is conducted by way of the intake lines 21 to the lower region of the mixing chamber 20. There, it can be mixed with fresh air from fresh-air lines 24. In the upper region, the mixed air is fed to the corresponding mixed-air lines. For example, the mixed air may be conducted into an aircraft cabin, a cockpit and/or a cargo hold.

The filter elements 22 are arranged in the space of the aircraft in such a way that on the one hand they are easily accessible, in order to make it easier for them to be exchanged, and on the other hand they receive recirculation air from both sides of the aircraft space, in order to make it possible for the recirculation air to be conducted uniformly and symmetrically around the passenger cabin arranged thereabove.

SUMMARY OF THE INVENTION

The invention is based on an object of providing a compact mixer assembly. The invention is also based on an object of providing a stowage space and an aircraft with such a mixer assembly and also a method for easily installing a mixer assembly.

According to a first aspect, a mixer assembly for mixing two air streams in a ventilation system comprises a mixing chamber. The mixing chamber has at least one inlet and at least one outlet and a mixing chamber wall delimiting the mixing chamber. The mixer assembly also comprises a shroud, which surrounds the mixing chamber wall, at least in certain portions, and in turn delimits an intermediate space between the mixing chamber wall and the shroud. Finally, the mixer assembly comprises a filter element, which fluidically connects the intermediate space to a surrounding area of the mixer assembly. Moreover, the intermediate space is fluidically connected to the mixing chamber.

This layered, onion-like construction leads to a very compact mixer assembly. In particular, dispensing with separate intake lines, as in conventional systems, allows a compact mixer assembly. Moreover, the intermediate space between the mixing chamber wall and the shroud assumes the function of a thermal insulation of the mixing chamber. A thermal insulation with respect to a surrounding area of the mixing chamber is achieved by the twin-shell construction alone, but also by the usually warmer fluid that can flow through the intermediate space. It is therefore possible to dispense with additional insulating elements, as are necessary in the case of conventional mixing chambers, as a result of which the construction of the mixer assembly is likewise very compact.

The filter element may also be arranged detachably on the mixer assembly and abutting the shroud. This direct arrangement makes it possible for the size of the mixer assembly to be reduced further. A fluid, for example recirculation air, can flow directly into the intermediate space after flowing through the filter element. For example, the shroud may have one or more openings, which are covered by the abutting filter element, and therefore the fluid (recirculation air) can flow through the filter element directly into the intermediate space through this opening/these openings. Moreover, effective soundproofing is provided by the arrangement of the filter element on the shroud and also on its opening(s). The outer filter element absorbs sound both from the intermediate space and from the mixing chamber, as a result of which no additional soundproofing measures are required.

The mixer assembly may also comprise a multiplicity of filter elements. The filter elements may in this case together cover the shroud, without overlapping one another. Alternatively or in addition, the filter elements may overlap one another, at least in certain portions, and thus form a multi-layered filter element. A number of thinner filter elements can be attached more easily, in particular in the case of mixing chambers that are more difficult to access, whereas a single filter element can be attached more quickly.

In a further variant configuration of the mixer assembly, the filter element may have on a side facing the shroud a contour which corresponds, at least in certain portions, to a contour of an outer side of the shroud. This form-fitting arrangement of the filter element on the shroud prevents air from being able to flow past the filter element into the intermediate space. Moreover, the filter element may have on an outer periphery of the filter element that is facing the shroud a sealing element, which abuts the shroud. This likewise prevents flow from passing around the filter element.

In yet a further variant configuration, the mixer assembly may also comprise a conveying device, which is designed for conveying a fluid through the filter element into the intermediate space and out of the intermediate space into the mixing chamber. The conveying device is, in this case, dimensioned such that it ensures a sufficient volumetric flow of fluid through the filter element to sufficiently provide the mixing chamber with recirculation air. Moreover, the volumetric flow of the recirculation air can be regulated by the conveying device. Alternatively, the mixer assembly may also comprise a multiplicity of conveying devices, which are respectively designed for conveying a fluid through the filter element into the intermediate space and out of the intermediate space into the mixing chamber.

According to one variant, the conveying device is arranged in the intermediate space. Thus, the conveying device can produce a volumetric flow within the intermediate space. If the intermediate space is closed with respect to the surrounding area of the mixer assembly with the exception of the openings facing the filter element, fluid is sucked into the intermediate space through the filter element.

Optionally, the fluid may be conveyed through the mixing chamber wall into the mixing chamber. For this, the mixing chamber wall may have one or more openings through which the fluid flows. In a variant configuration, the conveying device is completely accommodated between the mixing chamber wall and the shroud, at least one of the openings in the mixing chamber wall and the shroud being located on each of both sides of the conveying device (inlet side and outlet side). The intermediate space is formed, completely or at least a part thereof, as it were by the interior of the conveying device, the shroud serving for the mounting of the filter element, or else being dispensable. However, it is usually necessary for there to be an effective filter cross-sectional area that is greater than an area of the cross section of the conveying device in order to ensure trouble-free filtering of the fluid.

Likewise optionally, a nonreturn valve may be arranged on the outlet side of the conveying device and/or in/at the mixing chamber wall. This prevents fluid from flowing out of the mixing chamber into the intermediate space and/or the conveying device, instead of to the outlet of the mixing chamber.

Alternatively or in addition, the mixer assembly may also comprise a pre-mixer, which is fluidically coupled to the inlet of the mixing chamber. In this case, the conveying device can convey the fluid out of the intermediate space into the pre-mixer. In the pre-mixer, the fluid can be brought together with another fluid stream. Optionally, the pre-mixer may have a removal opening, in order to remove premixed fluid before it flows into the mixing chamber (for example for passing on into prioritized regions of the aircraft (for example the cockpit or air-consuming devices)).

In another variant configuration of the mixer assembly, it may also comprise a fresh-air feed line, which is fluidically coupled to the inlet of the mixing chamber. The fresh-air line can provide fresh air from an air-conditioning pack (for example an aircraft air-conditioning system). In the mixing chamber, the fresh air can subsequently be mixed with the recirculation air, the ratio of the two air streams satisfying various parameters. Just by way of example, these include temperature, humidity and the minimum supply of fresh air to each passenger.

According to a further aspect, a stowage space in a vehicle comprises a mixer assembly according to the first aspect or one of the variant configurations described. The stowage space may be a space in the belly of an aircraft, for example in the lower fuselage, at the roots of the wings and/or in the vicinity of an air-conditioning pack of the aircraft. The stowage space has feed lines with recirculation air or is in some other way fluidically coupled to a region of the aircraft (for example, a passenger cabin) (for example, by way of DADO panels), in order to conduct recirculation air into the stowage space and subsequently take it up (suck it in) through the filter element of the mixer assembly.

In a variant configuration, the stowage space may also comprise a partition wall, which separates the stowage space containing the mixer assembly from a cargo hold. The partition wall serves for closing off the cargo hold from other regions of the aircraft. Optionally, the partition wall may have at least one filter installation opening. In this case, the filter element may be designed for being pushed through the filter installation opening and, in an end position, fluidically connecting the intermediate space to the surrounding area of the mixer assembly and fluidically sealing off the filter installation opening. In other words, the partition wall and the mixer assembly are arranged in relation to one another in such a way that the filter element can be brought from the cargo hold into an installation position (end position) within the mixer assembly, in which the filter element filters the recirculation air conveyed into the mixing chamber.

The filter element may also have a closing-off element, which can be received, at least in certain portions, in the filter installation opening. For example, the closing-off element may have a portion of a form which corresponds to the filter installation opening. As a result, the filter element can completely close the filter installation opening. Either the closing-off element fits into the filter installation opening, the closing-off element finishing flush with the partition wall (that is to say, lying in one plane), or completely covers the filter installation opening, part of the closing-off element resting on the partition wall and consequently protruding from it (seen perpendicularly to the plane of the partition wall).

Optionally, the filter element or the partition wall may have (at the filter installation opening) a sealing element, in order to ensure fluidic sealing between the cargo hold and the stowage space. For example, a cargo hold must be sealed off from other regions of the aircraft in such a way that no hazardous substances (smoke, gases, etc.) can escape from the cargo hold and reach other regions (for example, the passenger cabin, cockpit, etc.).

In a further variant configuration, the closing-off element has a locking device, which is designed for locking the closing-off element on the partition wall in such a way that the filter element is fixed in its end position. As a result, the closing-off element can also be kept in the position in which it seals off the filter installation opening, and consequently the cargo hold.

According to a further aspect, a vehicle comprises a stowage space according to the above aspect or one of the associated variant configurations. The vehicle may be any vehicle that is equipped with a ventilation/air-conditioning system with recirculation air mixing. For example, the vehicle may be an aircraft.

According to yet a further aspect, a method for producing a mixer assembly in an aircraft comprises the following steps: providing a mixing chamber, which comprises a mixing chamber wall delimiting the mixing chamber; attaching a shroud, which surrounds the mixing chamber wall, at least in certain portions, and delimits an intermediate space between the mixing chamber wall and the shroud; attaching a filter element on an outer side of the shroud, the filter element fluidically connecting the intermediate space to a surrounding area of the mixer assembly, and the intermediate space being fluidically connected to the mixing chamber; introducing the mixer assembly with the attached shroud and filter element into a stowage space of the aircraft; and fastening the mixer assembly in the stowage space.

It is in this case possible to prefabricate the mixer assembly including the filter element outside the aircraft, and to install the prefabricated mixer assembly in the stowage space of the aircraft. As a result, the installation of a mixer assembly in a vehicle is speeded up significantly, since the assembly (production) of the mixer assembly can take place outside the vehicle. Furthermore, the lack of space in the stowage space of the vehicle, which usually slows down the assembly, can be avoided during the installation phase of the mixer assembly. Moreover, the assembly is also quicker, since no separate intake lines have to be laid in the stowage space.

The attachment of the shroud can also be performed in a production step of the mixing chamber. For example, the mixing chamber wall and the shroud can be produced in one step. Suitable for this are injecting methods, pulling methods, 3D printing methods or the like, it being possible for two parallel (or concentric) walls to be formed simultaneously.

In a variant, the method comprises furthermore removing the filter element from the mixer assembly; and attaching a new filter element on the outer side of the shroud. These steps can be performed without taking out other component parts of the mixer assembly. This exchanging of the filter element must usually be performed at regular intervals, and can be carried out particularly quickly because of the arrangement of the filter element at the mixing chamber. The filter element abutting the mixing chamber on the outside can be detached easily and quickly and replaced by a new filter element.

The configurations, variants and aspects described here can also be combined as desired, and therefore further variant configurations that are not explicitly described are included in the present disclosure.

BRIEF DESCRIPTION OF THE DRAWINGS

Exemplary embodiments of the invention are described in more detail below on the basis of the drawings.

DETAILED DESCRIPTION OF THE PREFERRED EMBODIMENTS

According to the present invention, a mixer assembly with a mixing chamber wall and a shroud surrounding the mixing chamber wall is described, a filter element fluidically connecting an intermediate space between the mixing chamber wall and the shroud to a surrounding area of the mixer assembly and the intermediate space being fluidically connected to the mixing chamber. A stowage space with such a mixer assembly, a vehicle with such a stowage space and a method for producing a mixer assembly are also described.

Figure 1:
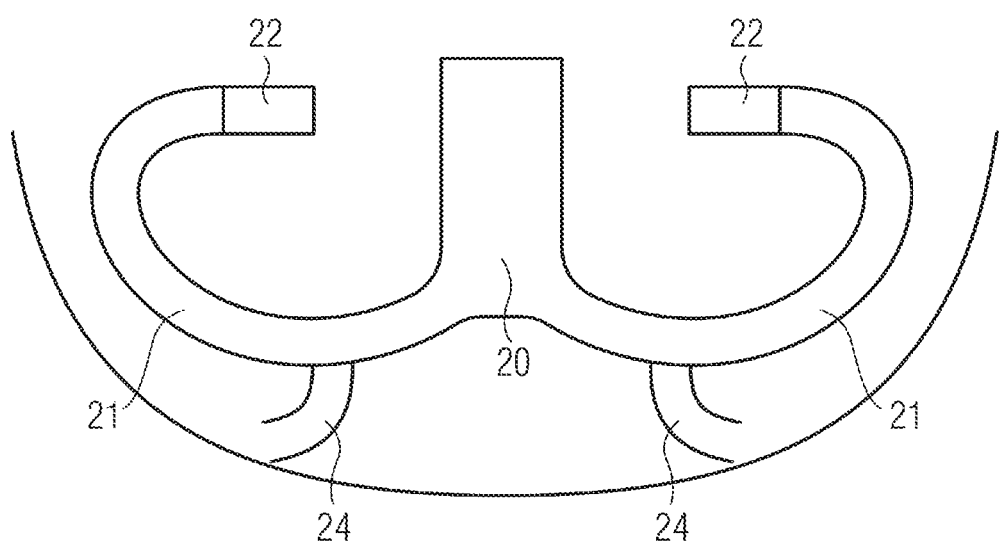
FIG. 1 schematically shows a conventional mixing chamber with further ventilation components, FIG. 2 schematically shows a perspective view of a mixer assembly, FIG. 3 schematically shows a plan view of a filter element of a mixer assembly, FIG. 4 schematically shows a cross section longitudinally through a mixer assembly, FIG. 5 schematically shows a detail of part of a cross section longitudinally through a mixer assembly according to a variant configuration, FIG. 6 schematically shows a view of a mixer assembly according to a further variant configuration, FIG. 7 schematically shows a side view of the mixer assembly from FIG. 6, FIG. 8 schematically shows a vehicle with a mixer assembly.
Figure 2:
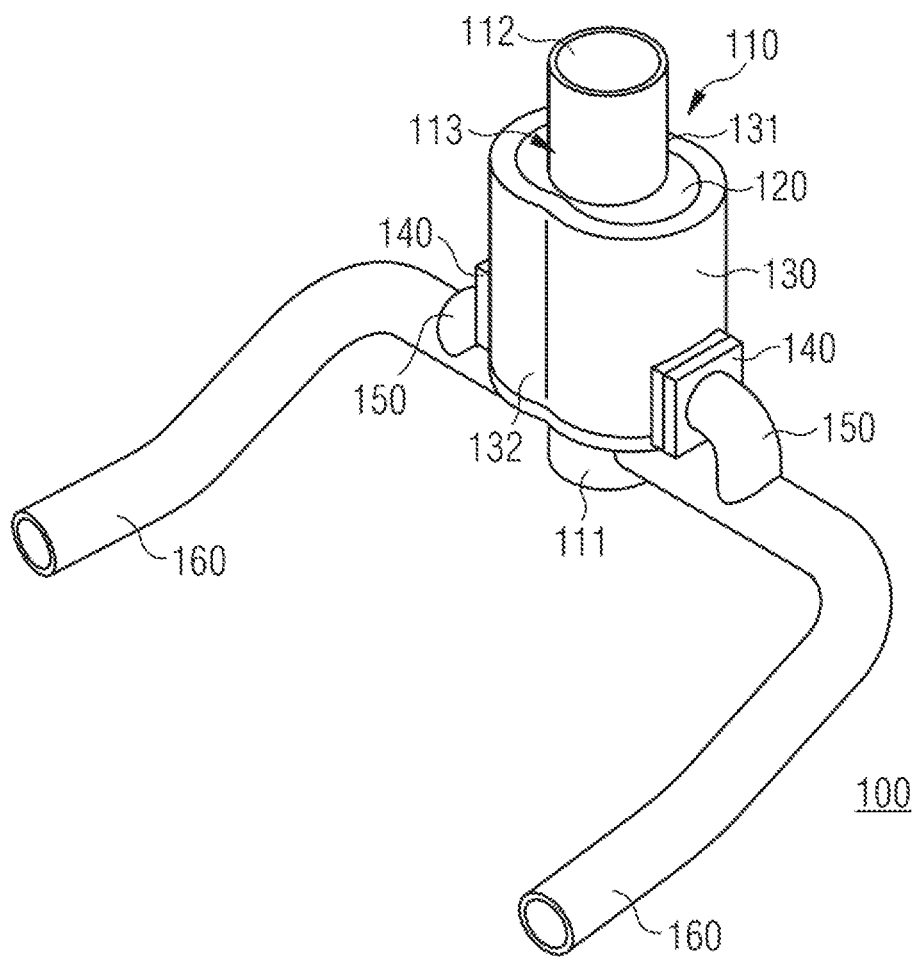
Figure 4:
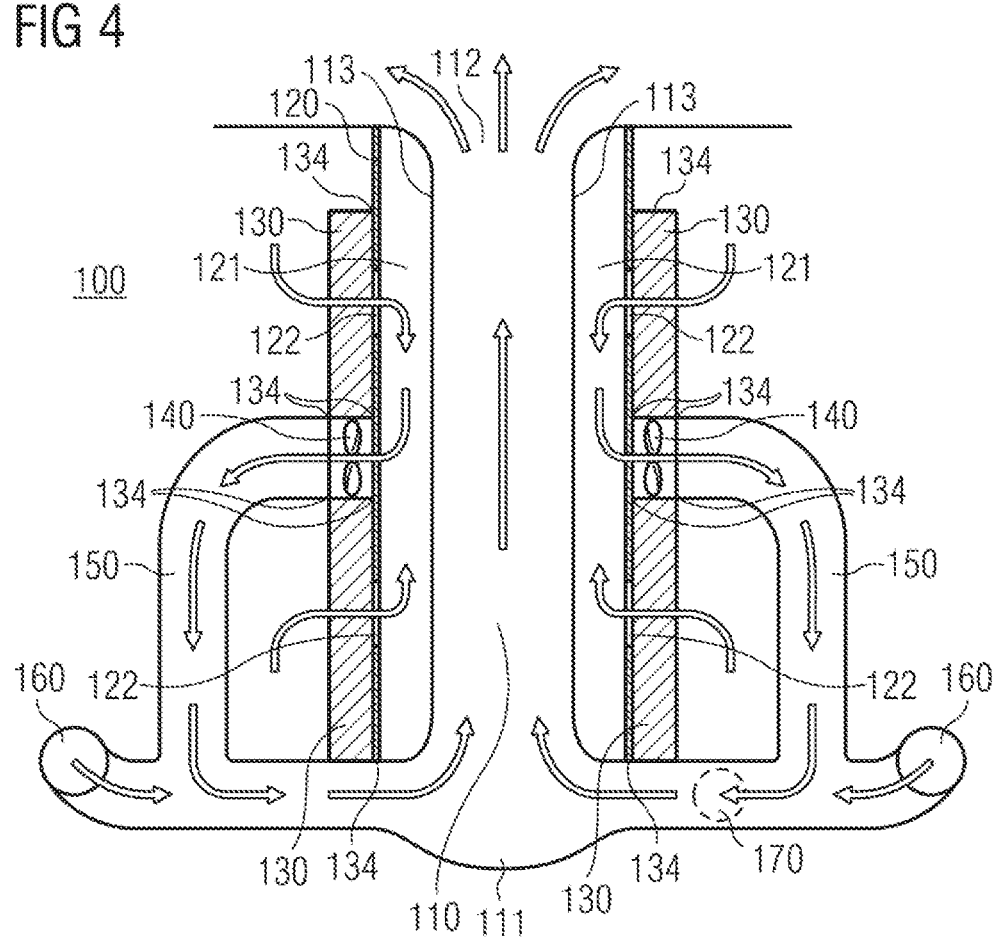

FIG. 2 schematically shows a perspective view of a mixer assembly 100, while FIG. 4 shows a schematic cross section longitudinally through a mixer assembly 100. The mixer assembly 100 comprises a mixing chamber 110, which has at least one inlet 111 and at least one outlet 112 and, lying in between, a mixing chamber wall 113 delimiting the mixing chamber 110. The mixing chamber 110 is surrounded both by a shroud 120 and by a filter element 130.

As can be seen from FIG. 4, the mixing chamber wall 113 is surrounded, at least in certain portions, by the shroud 120, the shroud 120 delimiting an intermediate space 121 between the mixing chamber wall 113 and the shroud 120. The intermediate space 121 may be flowed through by a fluid (for example air). The filter element 130 provided on the outside of the shroud 120 in this case fluidically connects the intermediate space 121 to a surrounding area of the mixer assembly 100. For example, the filter element 130 may rest on the shroud 120 and thereby cover an opening 122 in the shroud 120. In FIG. 4, merely by way of example, a single opening 122 is shown for each portion depicted of the filter element 130. It goes without saying that there may be more openings 122. The present disclosure is also not limited to the depicted size of the openings 122. For example, the shroud 120 may also comprise, at least in certain portions, a perforated plate, as a result of which the shroud 120 can be produced at low cost.

Figure 3:
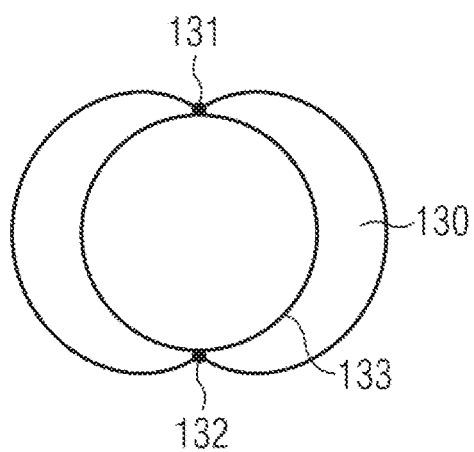

The filter element 130 is detachably arranged abutting on the mixer assembly 100 and on the shroud 120. For this, as can be seen from the schematic plan view of the filter element 130 shown in FIG. 3, the filter element 130 may be of a multipart configuration. For example, the filter element 130 may comprise two half-round parts, which are rotatably coupled to one another at a joint 131. The joint 131 may comprise a number of joints or else a piano hinge. On the opposite side, the two parts of the filter element 130 are connected to one another by a closure element 132. The closure element 132 may be configured very simply by eyes or other openings on each of the two filter element parts and a locking bolt inserted into the eyes or other openings. It is similarly possible that the closure element 132 comprises, at least partially, a hook-and-loop closure.

The filter element 130 has on the side facing the shroud 120 (inner side) a contour 133, which corresponds, at least in certain portions, to a contour of an outer side of the shroud 120. As a result, firm abutment of the filter element 130 on the shroud 120 is achieved, which in turn prevents a fluid being sucked in between the filter element 130 and the shroud 120 and thereby bypassing the filter element 130. For example, the cross section of the attached filter element may be circular on the inner side (that is to say, the contour 133) and similarly the cross section of the shroud 120 may be circular with the same diameter.

In addition, on the filter element 130 or on the shroud 120, there may be arranged at least one sealing element 134, which seals off a slit between the filter element 130 and the shroud 120 at an outer periphery of the filter element 130. This ensures that no fluid is sucked in between the filter element 130 and the shroud 120, and could thereby bypass the filter element.

As can be inferred from the flow arrows from FIG. 4, a fluid, for example recirculation air in the surrounding area of the mixer assembly 100, is conveyed by means of a conveying device 140 through the filter element 130 into the intermediate space 121 (through the openings 122) and out of the intermediate space 121 into the mixing chamber 110. In other words, the conveying device 140 sucks the fluid out of the intermediate space 121, and therefore replenishing fluid flows from the surrounding area of the mixer assembly 100 through the filter element 130 and the openings 122.

According to the configuration from FIG. 4, the fluid thus filtered is passed on by the conveying device 140 by way of a pre-mixer 150, which is fluidically coupled to the inlet 111 of the mixing chamber 110. The pre-mixer 150 can premix the recirculation air thus conveyed with fresh air from a fresh-air line 160, before both air streams enter the mixing chamber 110 by way of the inlet 111. After complete mixing in the mixing chamber 110, the mixed air stream is conducted by way of the outlet 112 into regions of the vehicle that have to be supplied with fresh air, such as, for example, a passenger cabin 12 (see FIG. 8). Here, the outlet 112 of the mixing chamber 110 may be connected to a customary conducting system of a vehicle, for which reason this is not depicted here and is not described any further.

From the pre-mixer 150, a premixed air stream may be carried away by way of a corresponding connection 170. For example, specific regions that are distinguished by special requirements for the distribution of the incoming air (for example thermal requirements or particular demands with respect to the fresh-air/recirculation-air ratio), such as, for example, a cockpit, may be supplied with this air stream.

Figure 5:
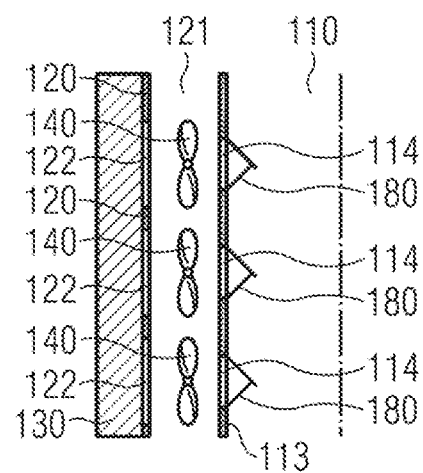

FIG. 5 schematically shows a detail of part of a cross section longitudinally through a mixer assembly 100 according to a variant configuration. In this variant, the conveying device 140 is arranged in the intermediate space 121. As a result, the fluid can be conveyed through the mixing chamber wall 113 into the mixing chamber 110 without having to fit a pre-mixer 150 (see FIG. 4). The conveying device 140 or number of conveying devices 140 may be (respectively) arranged in front of an opening 114 in the mixing chamber wall 113. The opening(s) 122 in the shroud 120 may lie opposite the openings 114 of the mixing chamber wall 113, and therefore the one or more conveying device(s) 140 can lie between these two openings 121, 114. Alternatively, the openings 122, 114 may also be arranged offset in relation to one another in the longitudinal direction of the mixing chamber 110, as is shown in FIG. 5. This makes possible an at least partial mixing of the streams of filtered fluid within the intermediate space 120.

The construction otherwise of the mixer assembly 100 corresponds to the construction shown in FIG. 4, and is therefore not explained any further. Since a fluid from another source (for example fresh air by way of fresh-air line 160) is also conducted into the mixing chamber 110 by way of the inlet 111, nonreturn valves 180 prevent fresh air from escaping from the mixing chamber 110 in the direction of the conveying device 140 and the filter element 130.

Figure 6:
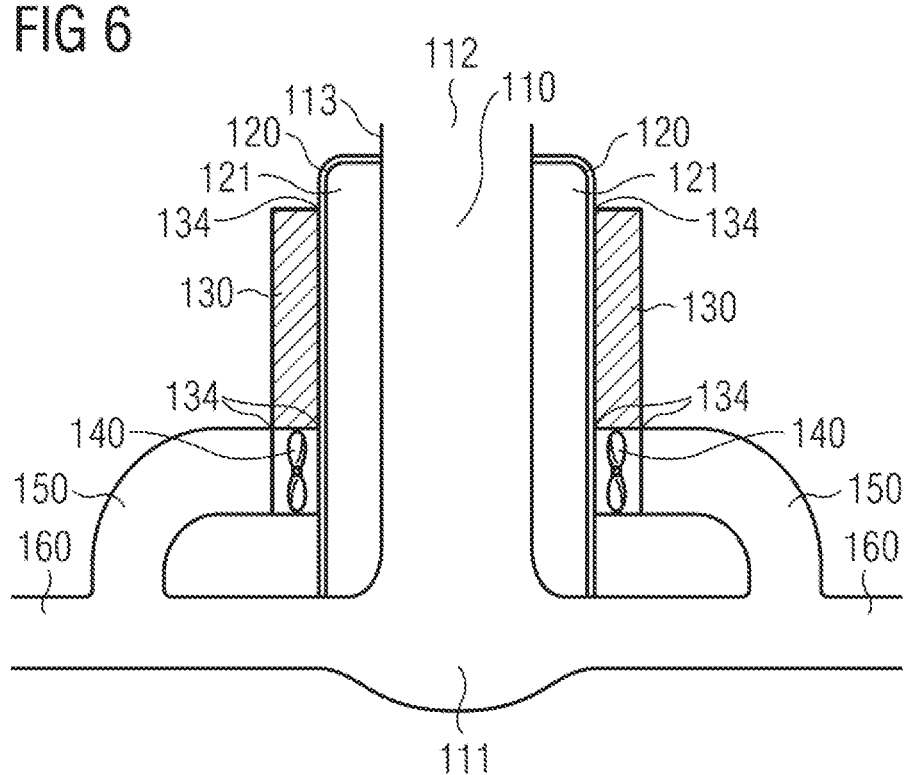

FIG. 6 schematically shows a view of a mixer assembly 100 according to a further variant configuration. The view depicted in FIG. 6 shows a cross section through the mixer assembly 100 similar to FIG. 4. As a difference from the variant shown in FIGS. 2 and 3, the filter element 130 is of a rectangular configuration, therefore has no curvatures. In a way corresponding to the filter element 130, the shroud 120 is also straight, at least in the region in which the filter element 130 abuts. This allows easier removal of the filter element, since it can be pulled out like a drawer. Here, too, a sealing element 134 may be provided, in order to arrange the filter element 130 in a fluid-tight manner on the shroud 120.

Figure 7:
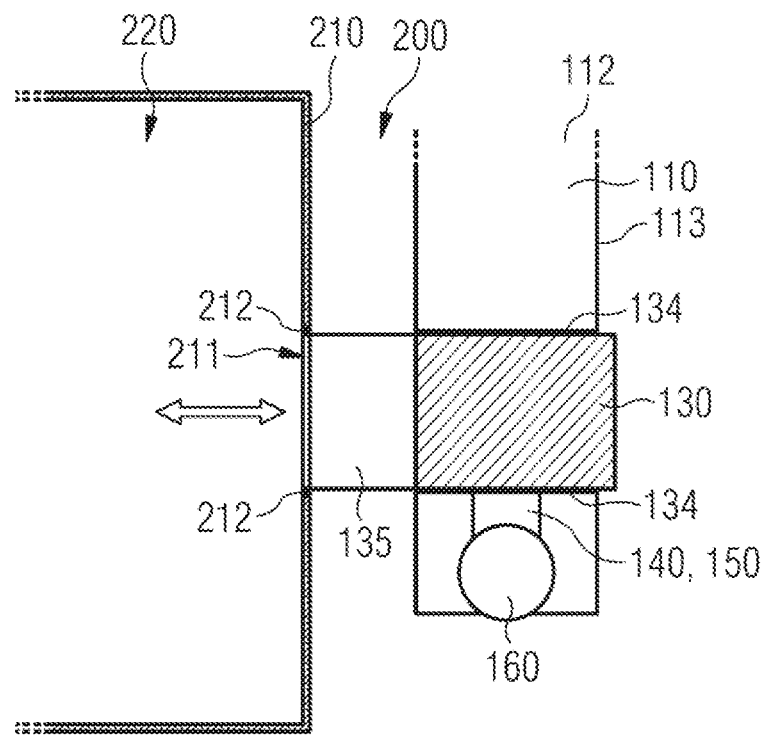

FIG. 7 schematically shows a side view of the mixer assembly 100 from FIG. 6. Here, the arrangement of the mixer assembly 100 in a stowage space 200 of the vehicle 11 is depicted. The stowage space 200 is separated from a cargo hold 220 by a partition wall 210. Respectively provided in the partition wall 210 is a filter installation opening 211, through which one of the filter elements 130 can be pushed in and out. The completely pushed-in filter element 130 can, in its end position, fluidically connect the intermediate space 121 to the surrounding area of the mixer assembly 100 and at the same time fluidically seal off the filter installation opening 211. By corresponding guiding elements (not depicted), the filter element 130 can be guided to its end position. For example, rails or other sliding devices may be provided for this, in order to accomplish the "drawer function."

In order to fluidically seal off the cargo hold, even when the filter elements 130 are inserted, a further sealing element 212 may be provided. This may be arranged, for example, along an edge of the filter installation opening 211 and/or along a corresponding edge or side of a closing-off element 135 of the filter element 130. The closing-off element 135 has a form which corresponds to a form of the filter installation opening 211. As a result, the closing-off element 135 can be arranged flush with the partition wall 210 when the filter element 130 has reached its end position (position for use at the shroud 120). Alternatively, the closing-off element 135 may completely cover the filter installation opening 211 and have a kind of cover (not depicted), which has a larger form than the filter installation opening 211.

This arrangement makes possible a quick exchange of the filter elements 130 from the cargo hold 210, without having to open a separate access into the stowage space 210 for corresponding service personnel. As a result, a change of the filter elements 130 will be performed not only more easily but also at lower cost.

Figure 8:
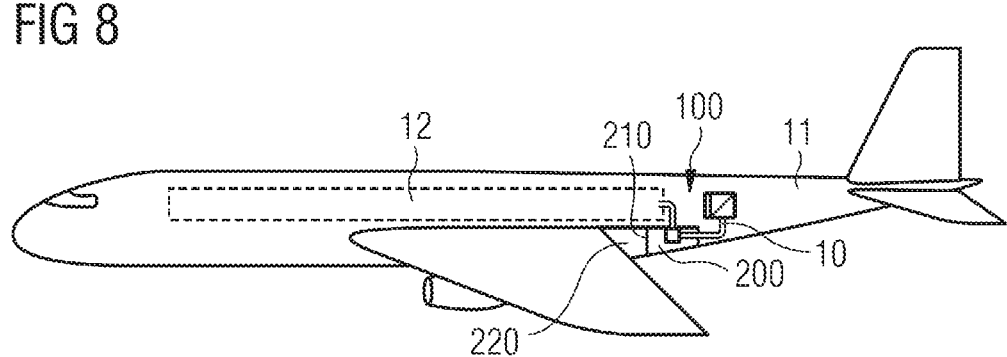

FIG. 8 schematically shows a vehicle 11 with a mixer assembly 100. The mixer assembly 100 may be arranged in a stowage space 200, which is separated from a cargo hold 220 by way of a partition wall 210. The mixer assembly 100 serves for mixing two air streams in a ventilation system 10, it being possible for the two mixed air streams to be fed to a region of the vehicle 11, for example a passenger cabin 12.

Figure 9:
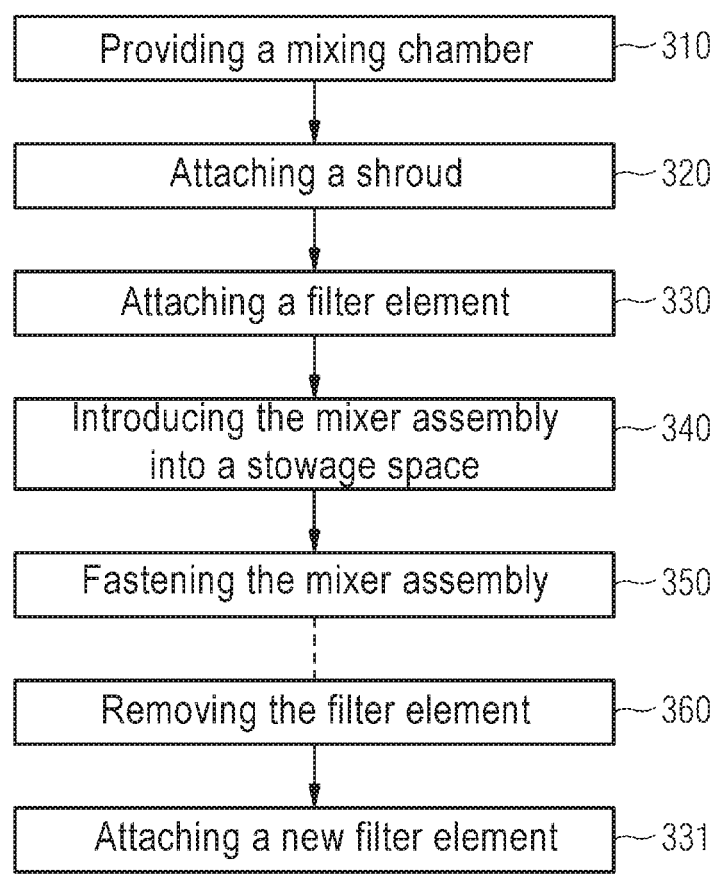
FIG. 9 shows a flow diagram of a method for producing a mixer assembly.

FIG. 9 shows a flow diagram of a method for producing a mixer assembly 100. In a first step 310, a mixing chamber 110 is provided, and subsequently, in step 320, a shroud 120, which surrounds the mixing chamber 113, at least in certain portions, is attached. The attaching 320 of the shroud 120 may also comprise integrating the shroud 120 with the mixing chamber 110. In other words, the shroud 120 may be produced in one piece with the mixing chamber 110. After that, the filter element 130 may be attached on an outer side of the shroud 120 in step 330. The filter element 130 will thereby fluidically connect the intermediate space 121 to a surrounding area of the mixer assembly 100, as described with reference to FIGS. 2 to 7.

The mixer assembly 100 prefabricated in this way can be introduced into a stowage space 200 of the aircraft 11 (step 340) in a final production process of the aircraft 11, for example on the final assembly line (FAL). Subsequently, the mixer assembly 100 with the already attached shroud 120 may be fastened in the stowage space 200 in step 350. Optionally, the filter element 130 may also already be attached when the mixer assembly 100 is introduced into the stowage space 200 and fastened there. The filter element 130 may also only be arranged on/at the mixer assembly 100 after fastening of the mixer assembly 100 in the stowage space 200.

Not only is the thus arranged installation of a mixer assembly 100 particularly quick and easy, but so too is the changing of the filter element 130 of such a mixer assembly 100. Thus, in a further step 360, the filter element 130 may be removed from the mixer assembly 100, while the rest of the mixer assembly remains in the stowage space 200 of the aircraft 11. Subsequently, in step 331, a new filter element 130 can be attached on the outer side of the shroud 120. This may take place either by enclosing the shroud 120 with a filter element 130 according to FIGS. 2 and 3 or by pushing in a filter element 130 according to FIGS. 6 and 7.

The variants, configurations and exemplary embodiments discussed above serve merely for describing the claimed teaching, but do not restrict the latter to the variants, configurations and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mixer assembly for mixing two air streams in a ventilation system, the mixer assembly comprising:
   a mixing chamber comprising an inlet and an outlet and a mixing chamber wall delimiting the mixing chamber;
   a shroud surrounding the mixing chamber wall, at least in certain portions, the shroud delimiting an intermediate space between the mixing chamber wall and the shroud and having one or more openings, and
   a filter element disposed adjacent to an outer surface of the shroud and covering one or more openings of the shroud,
      the filter element fluidically connecting the intermediate space to a surrounding area of the mixer assembly by allowing fluid to flow through the filter element directly through said one or more openings into the intermediate space, and
      the intermediate space being fluidically connected to the mixing chamber.

2. The mixer assembly according to claim 1, the filter element being arranged detachably on the mixer assembly and abutting the shroud.

3. The mixer assembly according to claim 2, the filter element having on a side facing the shroud a contour which corresponds, at least in certain portions, to a contour of an outer side of the shroud.

4. The mixer assembly according to claim 1, further comprising:
   a conveying device configured to convey a fluid through the filter element into the intermediate space and out of the intermediate space into the mixing chamber.

5. The mixer assembly according to claim 4, the conveying device being arranged in the intermediate space and conveying the fluid through the mixing chamber wall into the mixing chamber.

6. The mixer assembly according to claim 4, further comprising:
   a pre-mixer fluidically coupled to the inlet of the mixing chamber,
   the conveying device conveying the fluid out of the intermediate space into the pre-mixer.

7. The mixer assembly according to claim 1, further comprising:
   a fresh-air feed line fluidically coupled to the inlet of the mixing chamber.

8. A stowage space in a vehicle, the stowage space comprising:
   a mixer assembly according to claim 1.

9. The stowage space according to claim 8, further comprising:
   a partition wall, which separates the stowage space containing the mixer assembly from a cargo hold and has at least one filter installation opening,
   the filter element being designed for being pushed through the filter installation opening and, in an end position, fluidically connecting the intermediate space to the surrounding area of the mixer assembly and fluidically sealing off the filter installation opening.

10. The stowage space according to claim 9, further comprising:
    a closing-off element configured to fluidically seal off the filter installation opening.

11. The stowage space according to claim 10, the closing-off element having a form which corresponds to a form of the filter installation opening or completely covers the filter installation opening.

12. An aircraft with a stowage space according to claim 8.

13. A method for producing a mixer assembly in an aircraft, the method comprising:
    providing a mixing chamber comprising a mixing chamber wall delimiting the mixing chamber;
    attaching a shroud surrounding the mixing chamber wall, at least in certain portions, and delimiting an intermediate space between the mixing chamber wall and the shroud, the shroud comprising one or more openings;
    attaching a filter element on an outer side of the shroud, the filter element covering one of more openings in the shroud and fluidically connecting the intermediate space to a surrounding area of the mixer assembly, and the intermediate space being fluidically connected to the mixing chamber by allowing fluid to flow through the filter element directly through said one or more openings into the intermediate space;
    introducing the mixer assembly with the attached shroud and filter element into a stowage space of the aircraft; and
    fastening the mixer assembly in the stowage space.

14. The method according to claim 13, further comprising:
    removing the filter element from the mixer assembly; and
    attaching a new filter element on the outer side of the shroud.

* * * * *